US010704396B2

(12) United States Patent
LoRicco et al.

(10) Patent No.: US 10,704,396 B2
(45) Date of Patent: Jul. 7, 2020

(54) DUAL-WALL IMPINGEMENT CAVITY FOR COMPONENTS OF GAS TURBINE ENGINES

(71) Applicant: United Technologies Corporation, Farmington, CT (US)

(72) Inventors: Nicholas M. LoRicco, Windsor, CT (US); Ricardo Trindade, Mansfield, CT (US); Dominic J. Mongillo, Jr., West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/876,579

(22) Filed: Jan. 22, 2018

(65) Prior Publication Data
US 2019/0226343 A1    Jul. 25, 2019

(51) Int. Cl.
*F01D 5/18*    (2006.01)
*F01D 9/04*    (2006.01)

(52) U.S. Cl.
CPC ............ *F01D 5/186* (2013.01); *F01D 5/188* (2013.01); *F01D 5/189* (2013.01); *F01D 9/041* (2013.01); *F05D 2240/121* (2013.01); *F05D 2240/301* (2013.01); *F05D 2240/303* (2013.01); *F05D 2260/201* (2013.01); *F05D 2260/202* (2013.01); *F05D 2260/22141* (2013.01)

(58) Field of Classification Search
CPC .......... F01D 5/186; F01D 5/187; F01D 5/188; F01D 5/189; F01D 9/041; F05D 2240/121; F05D 2240/301; F05D 2240/303; F05D 2260/201; F05D 2260/202
See application file for complete search history.

(56) References Cited

U.S. PATENT DOCUMENTS

| 5,660,524 A | * | 8/1997 | Lee ...................... F01D 5/182 |
| | | | 415/115 |
| 7,556,476 B1 | | 7/2009 | Liang |
| 7,625,180 B1 | | 12/2009 | Liang |

(Continued)

FOREIGN PATENT DOCUMENTS

| DE | 4441507 A1 | 5/1995 |
| EP | 2716868 A2 | 4/2014 |

OTHER PUBLICATIONS

European Search Report for European Application No. 19153134.2, International Filing Date Jan. 22, 2019, dated Jun. 17, 2019, 6 pages.

*Primary Examiner* — Richard A Edgar
*Assistant Examiner* — Michael K. Reitz
(74) *Attorney, Agent, or Firm* — Cantor Colburn LLP

(57) ABSTRACT

Components for gas turbine engines are provided. The components include a hot external wall that is exposed to hot gaspath air when installed within a gas turbine engine, and an interior impingement wall, wherein the interior impingement wall defines a feed cavity and at least one impingement cavity is defined between the impingement wall and the external wall. The impingement wall includes a plurality of impingement holes that fluidly connect the feed cavity to the at least one impingement cavity, the external wall includes a plurality of film holes that fluidly connect the at least one impingement cavity to an exterior surface of the external wall, and wherein the only source of cooling air within the at least one impingement cavity is the feed cavity.

8 Claims, 4 Drawing Sheets

(56) References Cited

U.S. PATENT DOCUMENTS

| | | |
|---|---|---|
| 8,608,430 B1 | 12/2013 | Liang |
| 9,376,918 B2 | 6/2016 | Harding |
| 2011/0123351 A1 | 5/2011 | Hada et al. |
| 2014/0093379 A1* | 4/2014 | Tibbott .................. F01D 5/189 416/224 |
| 2015/0016973 A1* | 1/2015 | Mugglestone .......... F01D 5/189 415/175 |
| 2017/0107825 A1* | 4/2017 | Krumanaker ........... F01D 5/187 |

* cited by examiner

DUAL-WALL IMPINGEMENT CAVITY FOR COMPONENTS OF GAS TURBINE ENGINES

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Airfoils may incorporate various cooling cavities located adjacent external side walls. Such cooling cavities are subject to both hot material walls (exterior or external) and cold material walls (interior or internal). Although such cavities are designed for cooling portions of airfoil bodies, various cooling flow characteristics can cause hot sections where cooling may not be sufficient. Accordingly, improved means for providing cooling within an airfoil may be desirable.

BRIEF DESCRIPTION

According to some embodiments, components for gas turbine engines are provided. The components include a hot external wall that is exposed to hot gaspath air when installed within a gas turbine engine and an interior impingement wall, wherein the interior impingement wall defines a feed cavity and at least one impingement cavity is defined between the impingement wall and the external wall. The impingement wall includes a plurality of impingement holes that fluidly connect the feed cavity to the at least one impingement cavity, the external wall includes a plurality of film holes that fluidly connect the at least one impingement cavity to an exterior surface of the external wall, and wherein the only source of cooling air within the at least one impingement cavity is the feed cavity.

In addition to one or more of the features described herein, or as an alternative, further embodiments of the components may include that the component is an airfoil of a gas turbine engine.

In addition to one or more of the features described herein, or as an alternative, further embodiments of the components may include that the feed cavity and the at least one impingement cavity form a leading edge cavity of the airfoil.

In addition to one or more of the features described herein, or as an alternative, further embodiments of the components may include one or more ribs, wherein the one or more ribs divide the at least one impingement cavity into a first impingement cavity, a second impingement cavity, and a third impingement cavity.

In addition to one or more of the features described herein, or as an alternative, further embodiments of the components may include that the first impingement cavity is a leading edge impingement cavity, the second impingement cavity is a pressure side impingement cavity, and the third impingement cavity is a suction side impingement cavity.

In addition to one or more of the features described herein, or as an alternative, further embodiments of the components may include a divider rib located within the feed cavity and arranged to divide the feed cavity into two or more feed sub-cavities.

In addition to one or more of the features described herein, or as an alternative, further embodiments of the components may include that a first of the two or more feed sub-cavities is sourced with cooling air from a first cooling source and a second of the two or more feed sub-cavities is sourced with cooling air from a second cooling source that is different from the first cooling source.

In addition to one or more of the features described herein, or as an alternative, further embodiments of the components may include that the first cooling source is an inner diameter cooling source of the gas turbine engine and the second cooling source is an outer diameter cooling source of the gas turbine engine.

In addition to one or more of the features described herein, or as an alternative, further embodiments of the components may include that the airfoil is a vane of a turbine section of the gas turbine engine.

In addition to one or more of the features described herein, or as an alternative, further embodiments of the components may include that an internal surface of the hot wall includes a plurality of heat augmentation features located within the at least one impingement cavity.

According to some embodiments, gas turbine engines are provided. The gas turbine engines include a component having a hot external wall that is exposed to hot gaspath air when installed within a gas turbine engine and an interior impingement wall, wherein the interior impingement wall defines a feed cavity and at least one impingement cavity is defined between the impingement wall and the external wall. The impingement wall includes a plurality of impingement holes that fluidly connect the feed cavity to the at least one impingement cavity, the external wall includes a plurality of film holes that fluidly connect the at least one impingement cavity to an exterior surface of the external wall, and wherein the only source of cooling air within the at least one impingement cavity is the feed cavity.

In addition to one or more of the features described herein, or as an alternative, further embodiments of the components may include that the component is an airfoil of the gas turbine engine.

In addition to one or more of the features described herein, or as an alternative, further embodiments of the components may include that the feed cavity and the at least one impingement cavity form a leading edge cavity of the airfoil.

In addition to one or more of the features described herein, or as an alternative, further embodiments of the components may include one or more ribs, wherein the one or more ribs divide the at least one impingement cavity into a first impingement cavity, a second impingement cavity, and a third impingement cavity.

In addition to one or more of the features described herein, or as an alternative, further embodiments of the components may include that the first impingement cavity is a leading edge impingement cavity, the second impingement cavity is a pressure side impingement cavity, and the third impingement cavity is a suction side impingement cavity.

In addition to one or more of the features described herein, or as an alternative, further embodiments of the components may include a divider rib located within the feed cavity and arranged to divide the feed cavity into two or more feed sub-cavities.

In addition to one or more of the features described herein, or as an alternative, further embodiments of the components may include that a first of the two or more feed sub-cavities is sourced with cooling air from a first cooling source and a second of the two or more feed sub-cavities is sourced with cooling air from a second cooling source that is different from the first cooling source.

In addition to one or more of the features described herein, or as an alternative, further embodiments of the components may include that the first cooling source is an inner diameter cooling source of the gas turbine engine and the second cooling source is an outer diameter cooling source of the gas turbine engine.

In addition to one or more of the features described herein, or as an alternative, further embodiments of the components may include that the airfoil is a vane of a turbine section of the gas turbine engine.

In addition to one or more of the features described herein, or as an alternative, further embodiments of the components may include that an internal surface of the hot wall includes a plurality of heat augmentation features located within the at least one impingement cavity.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

DETAILED DESCRIPTION

Detailed descriptions of one or more embodiments of the disclosed apparatus and/or methods are presented herein by way of exemplification and not limitation with reference to the Figures.

Figure 1:
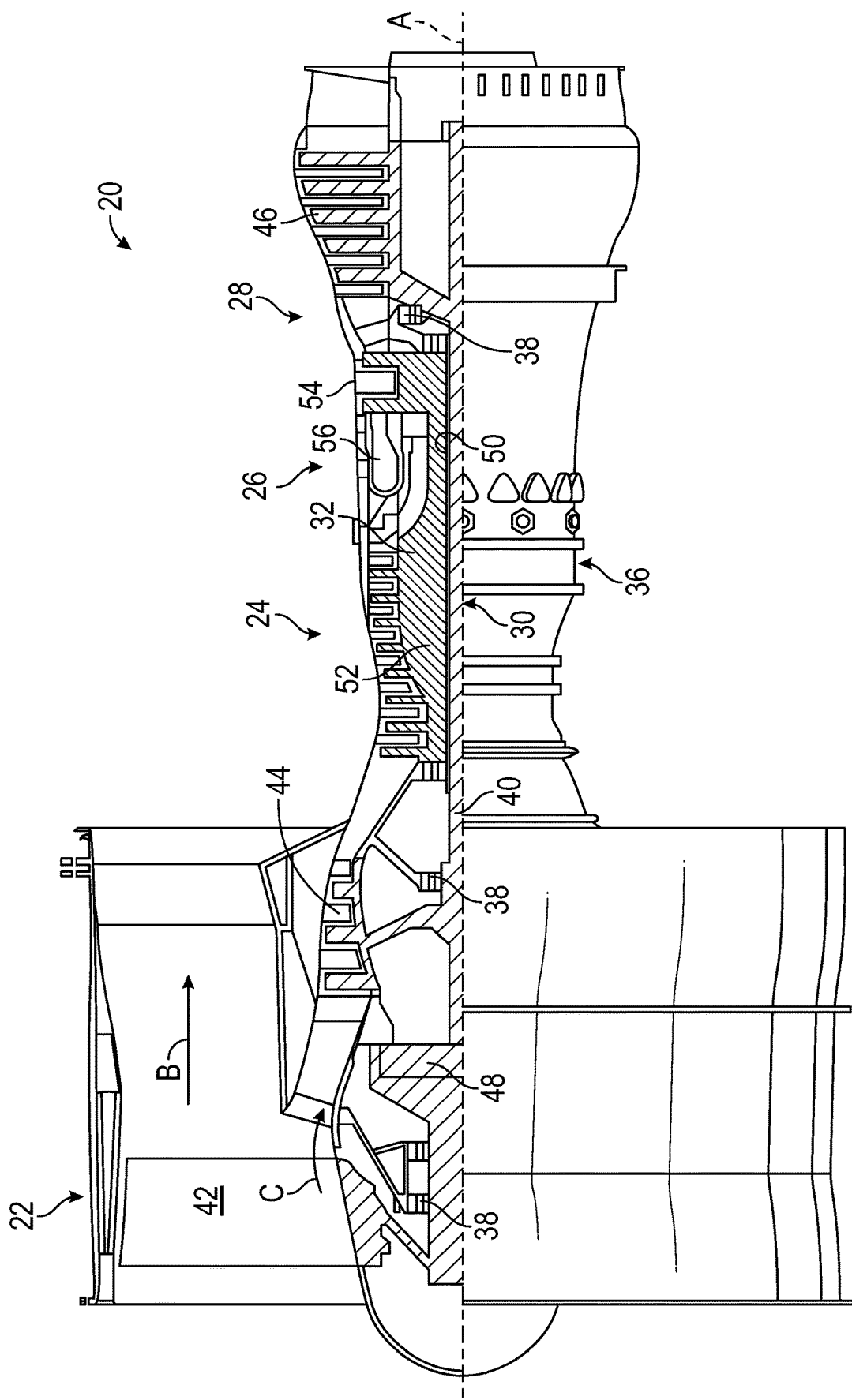
FIG. 1 is a schematic cross-sectional illustration of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one non-limiting example is a high-bypass geared aircraft engine. In a further non-limiting example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram° R)/(514.7° R)$^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets, turboshafts, and three-spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2:
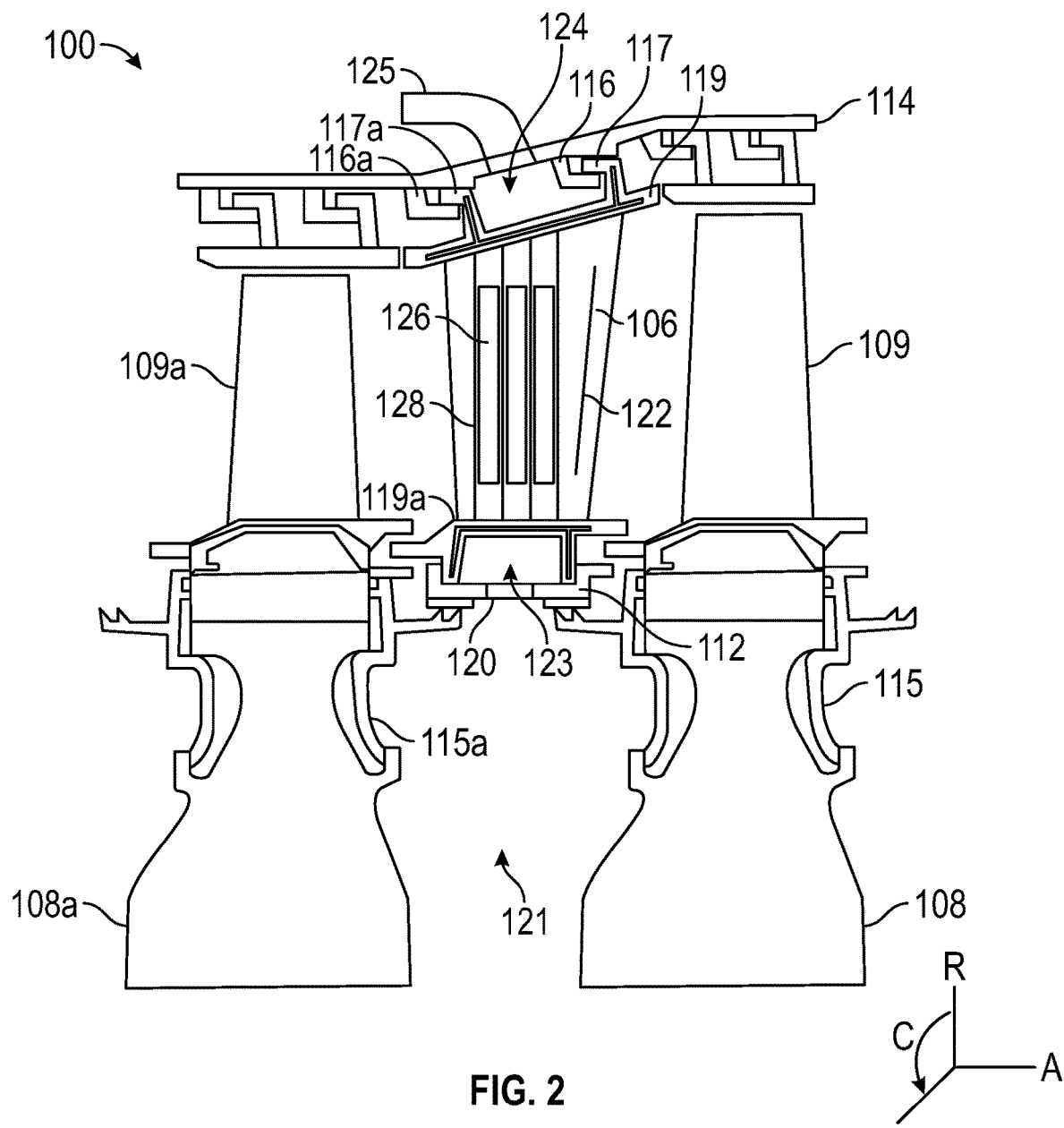
FIG. 2 is a schematic illustration of a portion of a turbine section of the gas turbine engine of FIG. 1.

Referring now to FIG. 2, a cooling design in a turbine section 28 for a gas turbine engine 20 may utilize a vane 106 disposed between axially adjacent bladed full hoop disks 108, 108a having respective blades 109, 109a. As shown, vane 106 is disposed radially between an inner air seal 112 and a full hoop case 114 on an outer side. Inner air seal 112 may be a full hoop structure supported by opposing vanes, including a plurality of vanes 106 that are separated in a circumferential direction. Vane 106 is supported by the full hoop case 114 through segmented vane hooks 117, 117a. One or more full hoop cover plates 115, 115a may minimize leakage between the vane 106 and the blades 109, 109a. The vane 106 is radially supported by the full hoop case 114 with segmented case hooks 116, 116a in mechanical connection with the segmented vane hooks 117, 117a. The vane 106 may be circumferentially supported between circumferentially adjacent platforms 119, 119a which may include feather seals that can minimize leakage between the adjacent vanes 106 into the gas path.

Although FIG. 2 depicts a second stage vane, as appreciated by those of skill in the art, embodiments provided herein can be applicable to first stage vanes as well. Such first stage vanes may have cooling flow supplied to the vane at both the inner and outer diameters, as opposed to the through-flow style cavity which goes from, for example, outer diameter to inner diameter. Thus, the present illustrations are not to be limiting but are rather provided for illustrative and explanatory purposes only.

In the present illustration, a turbine cooling air (TCA) conduit 125 provides cooling air into an outer diameter vane cavity 124 defined in part by an outer platform 119 and the full hoop case 114. The vane 106 is hollow so that air can travel radially into and longitudinally downstream from the outer diameter vane cavity 124, through the vane 106 via one or more vane cavities 122, and into a vane inner diameter cavity 123. The vane inner diameter cavity 123 is defined, in part, by an inner platform 119a. Thereafter air may travel through an orifice 120 in the inner air seal 112 and into a rotor cavity 121. Accordingly, cooling air for at least portions of the vane 106 will flow from a platform region, into the vane, and then out of the vane and into another platform region and/or into a hot gaspath/main gaspath. In some arrangements, the platforms 119, 119a can include ejection holes to enable some or all of the air to be injected into the main gaspath.

It is to be appreciated that the longitudinal orientation of vane 106 is illustrated in a radial direction, but other orientations for vane 106 are within the scope of the disclosure. In such alternate vane orientations, fluid such as cooling air can flow into the vane cavity 122 through an upstream opening illustrated herein as outer diameter cavity 124 and out through a downstream opening in vane cavity 122 illustrated herein as inner diameter cavity 123. A longitudinal span of vane cavity 122 being between such openings.

The vane 106, as shown, includes one or more baffles 126 located within the vane 106. The baffles 126 are positioned within one or more respective baffle cavities 128. The baffle cavities 128 are sub-portions or sub-cavities of the vane cavity 122. In some embodiments, such as shown in FIG. 2, the baffle cavities 128 are internal cavities that are axially inward from the leading and trailing edges of the vane 106, although such arrangement is not to be limiting.

As shown and labeled in FIG. 2, a radial direction R is upward on the page (e.g., radial with respect to an engine axis) and an axial direction A is to the right on the page (e.g., along an engine axis). Thus, radial cooling flows will travel up or down on the page and axial flows will travel left-to-right (or vice versa). A circumferential direction C is a direction into and out of the page about the engine axis.

Turbine airfoils, such as the blades and vanes shown in FIG. 2, require backside cooling to augment heat transfer to reduce metal temperatures to acceptable levels. In accordance with embodiments of the present disclosure, dual-walled leading edge configurations for airfoils are provided. In accordance with some embodiments, a plurality of impingement holes are provided in an interior impingement wall to form an array of cooling jets on the internal surface of the exterior wall of the airfoil. Such impingement generates high backside heat transfer coefficients. Further, in some embodiments described herein, the impingement wall contains flow separating ribs that can compartmentalize the gap between the hot exterior wall and the internal cold wall into different sections adjacent to portions of the leading edge surfaces of the airfoil. Such compartmentalization and segregation of individual impingement cavities allows for greater flexibility in optimization of the pressure drop split incurred between the impingement cooling and airfoil film cooling holes. Tailoring of the pressure drop split on a region-by-region basis improves the local thermal management of both the backside impingement and local film cooling holes. In this manner, a more optimal cooling design is achievable because backside impingement and file hold convection can be tailored to meet local back flow margin and blowing ratio criteria necessary to achieve desired local film cooling and thermal effectiveness requirements. Moreover, additional riblets, pedestals, or other features can be added on an as-needed basis to increase the number of conduction paths between the hot and cold wall, reducing the 'thermal strain' that exists between the hot exterior airfoil walls (i.e., exterior surface of the airfoil) and the cold internal walls (i.e., the impingement wall).

Further, in some embodiments, divider ribs may be provided within a feed cavity to form multi-flow passages and/or counter-flow circuits that transfer cooling airflow through feed airflows through the feed cavity. As such, relatively "clean" air (e.g., from the inner diameter) can supply cooling air flow to the leading edge and pressure side impingement cavities, while relatively "dirty" air (e.g., from the outer diameter) can supply cooling air flow to the suction side impingement cavities where dirt is more tolerable and less likely to accumulate due to higher film hole operating pressure ratios. Such separate feed flows/sources can improve thermal and aerodynamic performance as well as address local airfoil regions where the back flow margin of film cooling holes may be limiting potentially resulting in hot gas ingestion. As used herein, the term "clean" air refers to cooling air with low to no dirt or other particulate material within the air which can subsequently clog or otherwise impact a cooling scheme. In contrast, the term "dirty" air refers to cooling air which can include dirt or other particulate material. As will be appreciated by those of skill in the art, typically, air from an outer diameter source will be dirty (e.g., outer diameter platform cooling source) and air from an inner diameter source will be clean (e.g., inner diameter platform cooling source). As used herein, back flow margin is a ratio between local static pressure of a supply cooling air and local external dump pressure in the gaspath.

Figure 3:
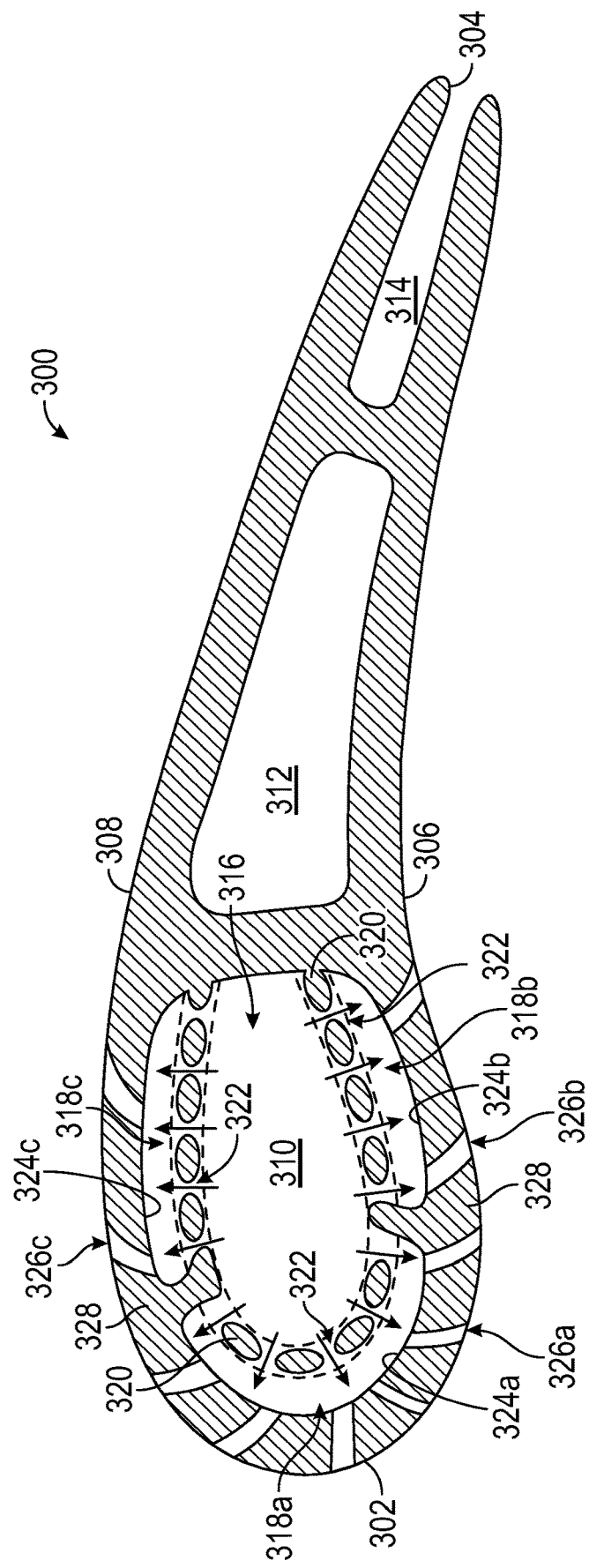
FIG. 3 is a schematic illustration of an airfoil in accordance with an embodiment of the present disclosure.

Turning now to FIG. 3, a schematic illustration of an airfoil 300 in accordance with an embodiment of the present disclosure is shown. The airfoil 300 may be a vane of a gas turbine engine, having a leading edge 302, a trailing edge 304, a pressure side 306, and a suction side 308. The airfoil 300 includes a plurality of interior cooling cavities, as will be appreciated by those of skill in the art. For example, as shown in FIG. 3, the airfoil 300 includes a leading edge cavity 310, a mid-cavity 312, and a trailing edge cavity 314.

The leading edge cavity 310 of the present disclosure is divided into a plurality of sub-cavities that are fluidly connected. For example, a feed cavity 316 is located in an interior portion of the airfoil 300, with no walls of the feed cavity 316 being exposed to the exterior surfaces of the airfoil 300 (e.g., not exposed to hot gaspath air, and is thus a "cold cavity"). External to the feed cavity 316 are a plurality of impingement cavities 318a, 318b, 318c. Although shown with three impingement cavities 318a, 318b, 318c, those of skill in the art will appreciate that any number of impingement cavities can be employ (e.g., one or more impingement cavities). The feed cavity 316 is separated from the impingement cavities 318a, 318b, 318c by an impingement wall 320.

The impingement wall 320 is a cold wall that is located within the interior of the airfoil 300 and is not exposed to hot gaspath air. The impingement wall 320 defines, at least in part, walls of the feed cavity 316. The feed cavity 316 can be supplied with cooling air from an external source that is not exposed to the gas path (e.g., from an inner diameter and/or outer diameter platform, as shown in FIG. 2). The cold air is fed into the feed cavity 316, which then flows and impinges into the impingement cavities 318a, 318b, 318c through impingement holes 322 that are formed in the impingement wall 320. The impinging air will impinge upon an interior hot wall surface 324a, 324b, 324c of each respective impingement cavity 318a, 318b, 318c to provide cooling to the hot walls of the airfoil 300. The impinging air will then purge out of the impingement cavities 318a, 318b, 318c through respective film holes 326a, 326b, 326c that fluidly connect the impingement cavities 318a, 318b, 318c to the exterior of the airfoil 300.

Although shown in FIG. 3 with impingement holes 322 being substantially similar at all locations in the impingement wall 320, such arrangement is not to be limiting. For example, the size, number, geometry, origination, and arrangement of the impingement holes may vary by region depending on cooling and back flow margin requirements within the specific impingement cavities 318a, 318b, 318c. Further, it is to be understood by those skilled in the art that the impingement cooling hole arrays may vary in spacing and/or hole diameter size in both a longitudinal (radial) direction, as well as, in an axial direction along the internal impingement cold wall 320. Additionally the impingement cavity height H, width W, and cross sectional area of each of the impingement cavities 318a, 318b, and 318c may also vary in both a longitudinal (radial) direction, as well as, in an axial direction to better optimize local backside impingement distance. For example, the impingement cavities may have a width W that is a distance along the hot or cold wall of the impingement cavities (e.g., axial or chord-wise direction relative to the airfoil) and a height H that is a distance or length between the hot wall and the cold wall of the impingement cavities (e.g., circumferential direction with respect to the airfoil), where the aspect ratio of an impingement cavity is defined as the ratio of the height H to the width W(H/W). In some embodiments, the by impingement cavities may have a varying height and width along a length thereof. The height H and/or width W can be varied along the length (e.g., $H_{first\ end} \neq H_{second\ end}$ and/or $W_{first\ end} \neq W_{second\ end}$ in the radial span-wise and chord-wise directions). However, some of the h impingement cavities of airfoils of the present disclosure may be uniform in dimension, and thus the present illustrations and description are merely for illustrative and explanatory purposes, and no limitation is intended. Variations in these geometric features enable for a more robust design that may be configured to achieve the desired thermal cooling effectiveness and pressure loss requirements as a function of the local external heat flux and airfoil surface static pressure distributions due to aerodynamic loading In the present illustration, the impingement cavities 318a, 318b, 318c are arranged about the leading edge 302 of the airfoil, with different impingement cavities located along different surfaces of the airfoil 300. For example, in this non-limiting embodiment, a first impingement cavity 318a is a leading edge impingement cavity that is arranged to have feed air flow from the feed cavity 316 through the impingement holes 322 and impinge upon a leading edge hot wall surface 324a of the airfoil 300. A second impingement cavity 318b is a pressure side impingement cavity that is arranged to have feed air flow from the feed cavity 316 through the impingement holes 322 and impinge upon a pressure side hot wall surface 324b of the airfoil 300. A third impingement cavity 318c is a suction side impingement cavity that is arranged to have feed air flow from the feed cavity 316 through the impingement holes 322 and impinge upon a suction side hot wall surface 324c of the airfoil 300.

The various impingement cavities 318a, 318b, 318c are separated from each other by ribs 328. The ribs 328 can extend between the exterior walls of the airfoil 300 (e.g., interior hot wall surface 324a, 324b, 324c) to the impingement wall 320 to divide the leading edge cavity 310 into the multiple impingement cavities 318a, 318b, 318c along the hot surfaces of the airfoil 300. The ribs 328 can extend in a radial direction from the inner diameter to the outer diameter of the airfoil 300 to define full radial extent impingement cavities 318a, 318b, 318c. However, in some embodiments, the impingement cavities 318a, 318b, 318c may not be full radial extend cavities, but rather may span less than a full radial extend of the airfoil 300. The ribs 328 are arranged to prevent fluid communication and/or bleed between the various impingement cavities 318a, 318b, 318c.

The impinging air within the impingement cavities 318a, 318b, 318c will subsequently flow out of the film holes 326a, 326b, 326c and form a film of air along the exterior hot surface of the airfoil 300. It is noted that the film holes 326a, 326b, 326c will cause a pressure differential within the impingement cavities 318a, 318b, 318c as compared to the feed cavity 316 to thus generate the impinging airflow. Further, in accordance with some embodiments, the only source of air for the impingement cavities 318a, 318b, 318c is the feed cavity 316, and thus there is little to no radial direction flow within the impingement cavities 318a, 318b, 318c. As such, in some embodiments, the impingement cavities 318a, 318b, 318c may be closed off or bound at the inner and outer diameters by ribs or walls such that the only fluid connections to the impingement cavities 318a, 318b, 318c are through the impingement holes 322 and the film holes 326a, 326b, 326c. In some embodiments, the same effect may be achieved via an insert into a final part assembly, such as a welded or brazed sheet metal cover plate which obstructs the end of the described channel. In some embodiments, the impingement cavities 318a, 318b, 318c extend from the inner diameter of the airfoil 300 to the outer diameter of airfoil 300, and in other embodiments, the impingement cavities 318a, 318b, 318c may extend for only a portion of the radial extent of the airfoil 300.

Figure 4:
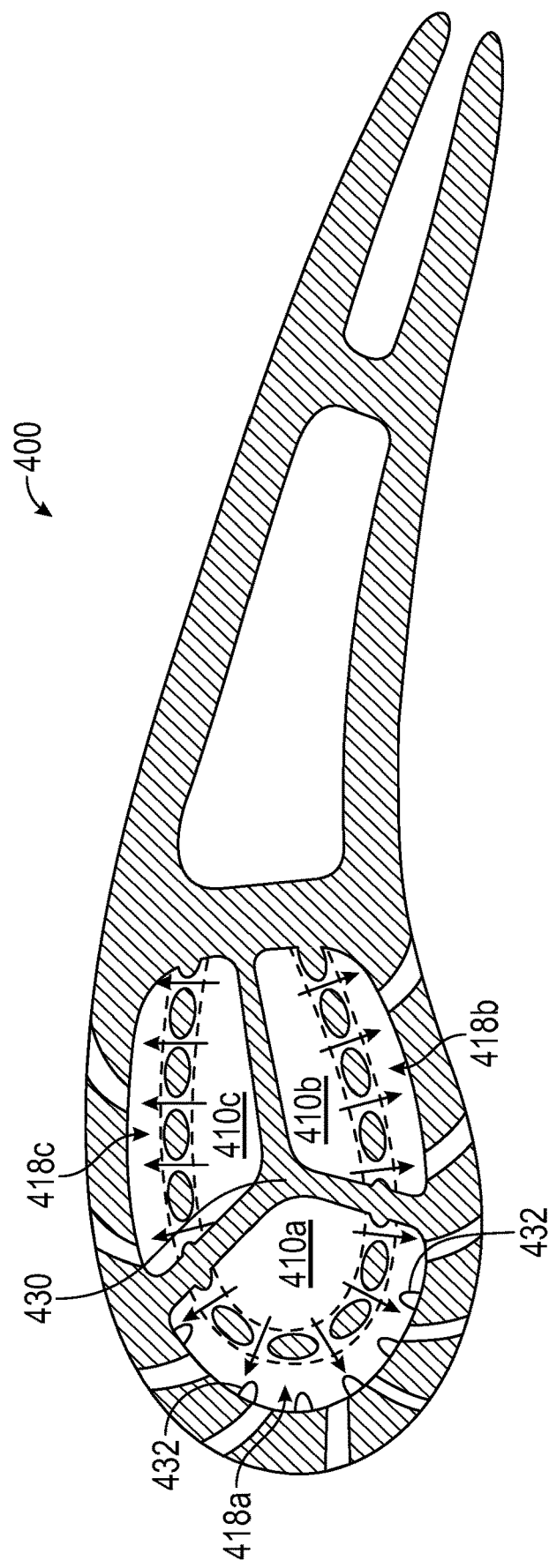
FIG. 4 is a schematic illustration of an airfoil in accordance with an embodiment of the present disclosure.

Turning now to FIG. 4, a schematic illustration of an airfoil 400 in accordance with an embodiment of the present disclosure. The airfoil 400 of FIG. 4 is similar to that shown and described with respect to FIG. 3, and thus like features may not be labeled and described again. As shown, the airfoil 400 includes a plurality of interior cooling cavities, with a leading edge cavity divided into a feed cavity and a plurality of impingement cavities 418a, 418b, 418c. In this embodiment, the feed cavity is divided into a plurality of feed sub-cavities 410a, 410b, 410c. Each of the feed sub-cavities 410a, 410b, 410c is fluidly separated from the other feed sub-cavities 410a, 410b, 410c by a divider rib 430. The divider rib 430 extends the radial extent of the airfoil 400 within the feed cavity.

The different feed sub-cavities 410a, 410b, 410c can be sourced from different sources of cooling air. For example, a first feed sub-cavity 410a and a second feed sub-cavity 410b can be sourced from an inner diameter source (e.g., inner diameter platform) which can supply relatively "clean" cooling air into respective first and second impingement cavities 418a, 418b. In contrast, the third feed sub-cavity 410c can be sourced from an outer diameter source (e.g., outer diameter platform) which can supply relatively "dirty" cooling air into the respective third impingement cavity 418c. In order to supply cooling air from only one source in sub-cavities 410a, 410b, 410c, it may be required that either the inner diameter or the outer diameter is closed off, which may be achieved through optimization of the design of the casting through adding solid wall or rib features, as well as via a sheet metal cover plate, which may be added to the finished assembly via welding or brazing.

Also shown in FIG. 4, the first impingement cavity 418a includes heat transfer augmentation features 432 on the hot wall of the first impingement cavity 418a. The heat transfer augmentation features 432 can be pedestals, trip strips, turbulators, riblets, etc. Although shown only in the first impingement cavity 418a, those of skill in the art will appreciate that any impingement cavity in accordance with the present disclosure can include heat transfer augmentation features. In addition to heat transfer augmentation features, double-walled airfoil designs often have issues with thermal stresses arising from large temperature gradients between the hot and cold walls. It is therefore understood that additional features may be required to reduce this 'thermal fight' between walls by providing a conduction path for heat to transfer from the hot to cold walls. Such features include pedestal, riblets, or any other features connecting the two walls.

Embodiments provided herein are directed to airfoil cavities having a double-wall construction that forms impingement cavities along a hot wall of the airfoil. Although shown and described with respect to a leading edge cavity, those of skill in the art will appreciate that any cooling cavity of an airfoil, or other component of a gas turbine engine (e.g., combustor panels, blade outer air seals, etc.) can incorporate embodiments as shown and described herein.

Advantageously, in accordance with some embodiments of the present disclosure, improved back flow margin can be achieved by sourcing leading edge air from two feeds (e.g., employing the feed sub-cavities shown in FIG. 4). Further, embodiments provided herein can enable segregation and supply of clean supply air to airfoil locations with a high propensity of hole-plugging while employing dirty supply air to locations without hole-plugging concerns. Moreover, segregation of sections of an airfoil with different external dump pressures allowing for better management of pressure drop and improved back flow margin. Furthermore, embodiments provided herein can enable improved backside heat transfer via dual-wall impingement schemes as shown and described.

Although the various above embodiments are shown as separate illustrations, those of skill in the art will appreciate that the various features can be combined, mix, and matched to form an airfoil having a desired cooling scheme that is enabled by one or more features described herein. Thus, the above described embodiments are not intended to be distinct arrangements and structures of airfoils and/or core structures, but rather are provided as separate embodiments for clarity and ease of explanation.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An airfoil for a gas turbine engine, the airfoil comprising:
   a hot external wall that is exposed to hot gaspath air when installed within the gas turbine engine, the hot external wall defining, at least in part, a leading edge, a pressure side, and a suction side of the airfoil;
   an interior impingement wall, wherein the interior impingement wall defines a feed cavity, a leading edge impingement cavity, a pressure side impingement cavity, and a suction side impingement cavity defined between the impingement wall and the external wall, wherein the interior impingement wall and the hot external wall are walls of the airfoil that define a double-walled airfoil construction, wherein the feed cavity, the leading edge impingement cavity, the pressure side impingement cavity, and the suction side impingement cavity form a leading edge cavity of the airfoil; and
   one or more radially extending ribs connecting the hot external wall to the interior impingement wall and configured to separate and define, in part, each of the leading edge impingement cavity, the pressure side impingement cavity, and the suction side impingement cavity, wherein the hot external wall, the interior impingement wall, and the one or more radially extending ribs form an airfoil body,
   wherein the impingement wall includes a plurality of impingement holes that fluidly connect the feed cavity to the leading edge impingement cavity, the pressure side impingement cavity, and the suction side impingement cavity, the plurality of impingement holes arranged to provide impingement cooling on internal surfaces of the hot external wall at each of the leading edge, the pressure side, and the suction side,
   the external wall includes a plurality of film holes that fluidly connect each impingement cavity to an exterior surface of the external wall, and
   wherein an only source of cooling air within the at least one impingement cavity is the feed cavity;
   a divider rib located within the feed cavity and arranged to divide the feed cavity into three feed sub-cavities,
   wherein a first and a second feed sub-cavities are sourced with cooling air from a first cooling source and a third feed sub-cavity is sourced with cooling air from a second cooling source that is different from the first cooling source,
   wherein each of the first and second feed sub-cavities are closed off at an outer diameter end such that the first cooling source is an inner diameter cooling source of the gas turbine engine,
   wherein the third feed sub-cavity is closed off at an inner diameter such that the second cooling source is an outer diameter cooling source of the gas turbine engine,
   wherein the first cooling source is a clean cooling air source and the second cooling source is a dirty cooling air source.

2. The airfoil of claim 1, wherein the airfoil is a vane of a turbine section of the gas turbine engine.

3. The airfoil of claim 1, wherein an internal surface of the hot wall includes a plurality of heat augmentation features located within the at least one impingement cavity.

4. A gas turbine engine comprising:
   an airfoil comprising:
   a hot external wall that is exposed to hot gaspath air when installed within the gas turbine engine, the hot external wall defining, at least in part, a leading edge, a pressure side, and a suction side of the airfoil;
   an interior impingement wall, wherein the interior impingement wall defines a feed cavity, a leading edge impingement cavity, a pressure side impingement cavity, and a suction side impingement cavity defined between the impingement wall and the external wall, wherein the interior impingement wall and the hot external wall are walls of the airfoil that define a double-walled airfoil construction, wherein the feed cavity, the leading edge impingement cavity, the pressure side impingement cavity, and the suction side impingement cavity form a leading edge cavity of the airfoil; and
   one or more radially extending ribs connecting the hot external wall to the interior impingement wall and configured to separate and define, in part, each of the leading edge impingement cavity, the pressure side impingement cavity, and the suction side impingement cavity, wherein the hot external wall, the interior impingement wall, and the one or more radially extending ribs form an airfoil body,
   wherein the impingement wall includes a plurality of impingement holes that fluidly connect the feed cavity to the leading edge impingement cavity, the pressure side impingement cavity, and the suction side impingement cavity, the plurality of impingement holes arranged to provide impingement cooling on internal surfaces of the hot external wall at each of the leading edge, the pressure side, and the suction side,
   the external wall includes a plurality of film holes that fluidly connect each impingement cavity to an exterior surface of the external wall, and
   wherein an only source of cooling air within the at least one impingement cavity is the feed cavity;
   a divider rib located within the feed cavity and arranged to divide the feed cavity into three feed sub-cavities,
   wherein a first and a second feed sub-cavities are sourced with cooling air from a first cooling source and a third feed sub-cavity is sourced with cooling air from a second cooling source that is different from the first cooling source,
   wherein each of the first and second feed sub-cavities are closed off at an outer diameter end such that the first cooling source is an inner diameter cooling source of the gas turbine engine,
   wherein the third feed sub-cavity is closed off at an inner diameter such that the second cooling source is an outer diameter cooling source of the gas turbine engine,
   wherein the first cooling source is a clean cooling air source and the second cooling source is a dirty cooling air source.

5. The gas turbine engine of claim 4, wherein the airfoil is a vane of a turbine section of the gas turbine engine.

6. The gas turbine engine of claim 4, wherein an internal surface of the hot wall includes a plurality of heat augmentation features located within the at least one impingement cavity.

7. The airfoil of claim 1, wherein the divider rib is an extension of one of the one or more ribs.

8. The airfoil of claim 4, wherein the divider rib is an extension of one of the one or more ribs.

* * * * *